W. W. HADEN.
SANITARY BANANA DISPLAY CASE.
APPLICATION FILED JUNE 9, 1911.
1,003,736.
Patented Sept. 19, 1911.
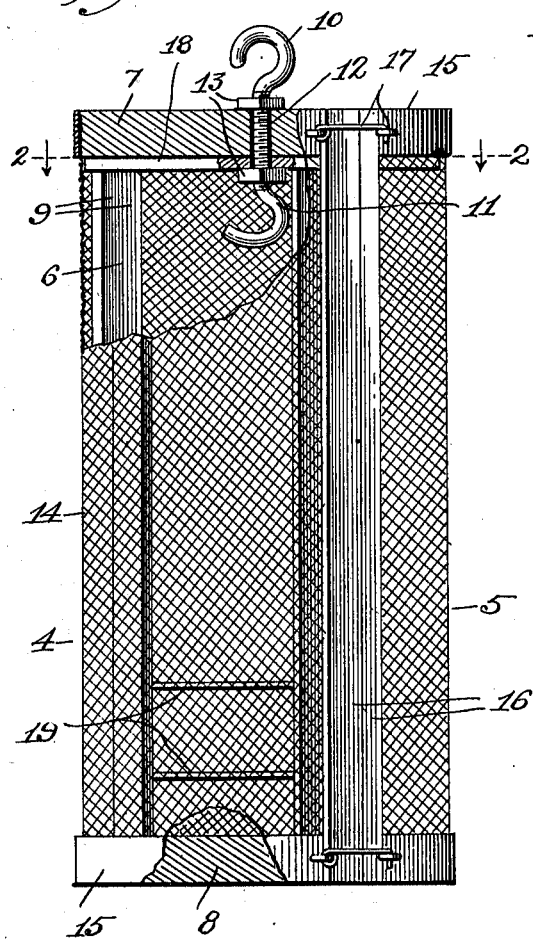
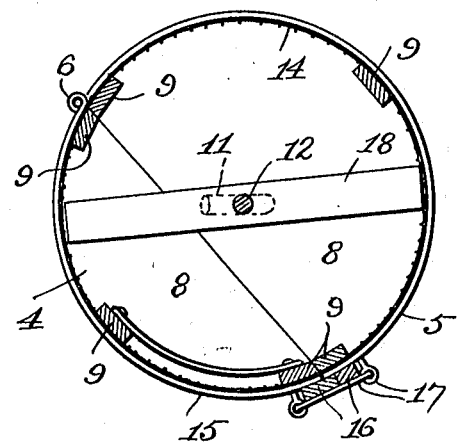
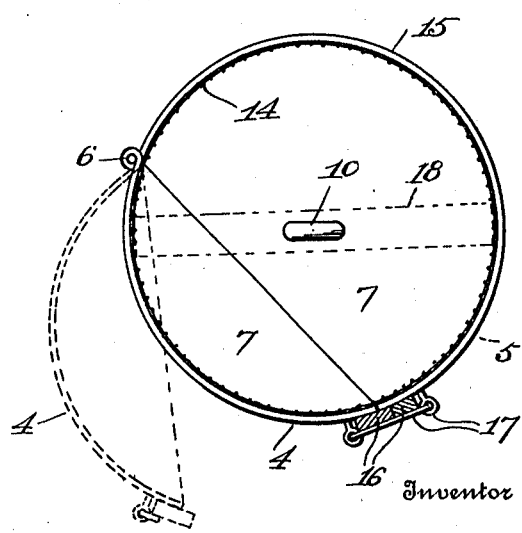
Witnesses
C. D. D——
P. B. Hills
Inventor
Wesley W. Haden
By Edwin L. Jewell
his Attorney
COLUMBIA PLANOGRAPH CO., WASHINGTON, D. C.

UNITED STATES PATENT OFFICE.

WESLEY W. HADEN, OF TIMPSON, TEXAS.

SANITARY BANANA-DISPLAY CASE.

1,003,736.

Specification of Letters Patent. Patented Sept. 19, 1911.

Application filed June 9, 1911. Serial No. 632,265.

*To all whom it may concern:*

Be it known that I, WESLEY W. HADEN, a citizen of the United States, residing at Timpson, in the county of Shelby and State of Texas, have invented certain new and useful Improvements in Sanitary Banana-Display Cases, of which the following is a specification.

This invention relates to improvements in sanitary banana display cases and has for its particular object to provide a device of this character whereby a bunch of bananas can be suspended by its stalk and protected from insects and unnecessary handling.

Another object is to provide a device of this character, whereby the case can be suspended independently of the fruit with means of access to said case to allow of the hanging of the fruit therein while suspended.

With these and other objects in view, the present invention consists in the combination and arrangement of parts as will be hereinafter more fully described, shown in the accompanying drawings, and particularly pointed out in the appended claim, it being understood that changes in form, proportion, size and minor details may be made within the scope of the claim without departing from the spirit or sacrificing any of the advantages of the invention.

In the accompanying drawing—Figure 1 is a side elevation of my improved device, portions being broken away and shown in section. Fig. 2 is a cross section on the line 2—2 of Fig. 1, and Fig. 3 is a plan view showing in dotted lines the hinged portion opened.

Like numerals of reference designate corresponding parts in all of the figures of the drawing.

The device is especially adapted for use in retailing bananas, is preferably cylindrical in shape, and comprises two parts 4 and 5 hinged together at 6, whereby the part 4 can be opened to allow of access to the interior. Both parts 4 and 5 are closed at their ends by tops 7 and bottoms 8 which are spaced apart and connected by the vertical braces 9, and the head of the part 5 which is the main body portion, is provided with means for suspending the case and for suspending the fruit therein. This suspending means comprises an outer hook 10, and an inner hook 11, connected by a shank 12, the whole preferably being formed integral, the shank being threaded for the reception of the nuts 13 which hold the hooks in operative position in the head. It is desirable that the said shank 12 be loosely passed through the head whereby the case as a whole can be rotated thereon. The case as shown is illustrated as a screen, being covered with a wire mesh 14 and secured at its edges to the tops and bottoms by the reinforcing strips or bands 15. Battens 16 are secured to the edges of the parts opposite the hinges, one of said battens overlapping the joint between the two parts. Fastening devices 17 comprising hooks and eyes lock the two parts together. To prevent the part 4 from sagging when open, a supporting strip 18 is pivoted upon the shank 12 between the lower face of the head of the part 5 and one of the nuts 13, thus as the part 4 is opened the under face of its head slides over the end of said strip and is supported thereby.

Connecting two of the vertical braces 9, adjacent the opening edges of the parts and at the bottom are the rods 19, which form pockets for the reception of paper bags.

The hinges are shown as being formed of the reinforcing strips 15, but separate hinges can be secured to the braces 6 in the same alinement of the present hinges.

It will be understood that instead of using a wire-mesh covering, the case can be inclosed in glass or other transparent material and while it is preferred to have the case loosely supported upon the hook member whereby it can be rotated around the bunch of fruit, the same can be fixed tightly to said hook member and the fruit rotated in the case.

From the foregoing description it will be obvious that the device furnishes a perfect protection to the fruit suspended therein and at the same time is easily accessible when desired.

Having thus fully described the invention what is claimed is:

A case of the character described, comprising a main body portion and a hinged portion both being covered with a protective covering through which the contents of the interior is discernible, a double hook for suspending the case and the contents, means secured to the body portion independent of the hinges for supporting the hinged member in an open position, and means for fastening the portions in a closed position.

In testimony whereof I affix my signature in presence of two witnesses.

WESLEY W. HADEN.

Witnesses:
E. N. WEAVER,
W. F. ANDREWS.

Copies of this patent may be obtained for five cents each, by addressing the "Commissioner of Patents, Washington, D. C."